United States Patent
Arnson

(10) Patent No.: US 6,366,772 B1
(45) Date of Patent: Apr. 2, 2002

(54) CALLER IDENTIFICATION DELIVERY IN A WIRELESS LOCAL LOOP OR OTHER SYSTEMS

(75) Inventor: Jill C. Arnson, Denver, CO (US)

(73) Assignee: Xircom Wireless, Inc., Colorado Springs, CO (US)

( * ) Notice: Subject to any disclaimer, the term of this patent is extended or adjusted under 35 U.S.C. 154(b) by 0 days.

(21) Appl. No.: 09/359,965

(22) Filed: Jul. 22, 1999

(51) Int. Cl.[7] .................................................. H04Q 7/16
(52) U.S. Cl. ...................... 455/415; 455/412; 455/414; 455/428; 455/466; 375/303
(58) Field of Search ............................... 455/415, 462, 455/463, 412, 414, 550, 575, 428, 461; 379/88.19, 88.2, 88.21, 142, 93.17, 93.23; 375/303

(56) References Cited

U.S. PATENT DOCUMENTS

| | | | | |
|---|---|---|---|---|
| 5,134,704 A | * | 7/1992 | Leuty ......................... | 370/216 |
| 5,467,385 A | * | 11/1995 | Reuben et al. ................. | 379/88 |
| 5,526,406 A | * | 6/1996 | Luneau ......................... | 379/61 |
| 5,799,060 A | * | 8/1998 | Kennedy et al. .............. | 379/29 |
| 5,805,677 A | * | 9/1998 | Ferry et al. ............... | 379/93.95 |
| 5,857,011 A | * | 1/1999 | Kennedy et al. .............. | 379/32 |
| 5,905,786 A | * | 5/1999 | Hoopes ....................... | 379/142 |
| 5,953,399 A | * | 9/1999 | Farris et al. ................. | 379/201 |
| 5,974,331 A | | 10/1999 | Cook et al. .................. | 455/461 |
| 5,995,611 A | * | 11/1999 | Mowafy et al. ............ | 379/201 |
| 6,005,921 A | * | 12/1999 | Keefe et al. .................... | 379/27 |
| 6,014,546 A | | 1/2000 | Georges et al. .............. | 455/3.1 |
| 6,032,034 A | | 2/2000 | Rabina et al. .............. | 455/401 |
| 6,052,444 A | * | 4/2000 | Ferry et al. .............. | 379/93.35 |
| 6,052,573 A | | 4/2000 | Ohmori et al. ............. | 455/401 |
| 6,104,909 A | * | 8/2000 | Baldwin et el. ............. | 455/5.1 |
| 6,108,630 A | * | 8/2000 | Kuechler et al. ........... | 704/270 |
| 6,167,271 A | * | 12/2000 | Parker et al. ............... | 455/445 |
| 6,249,808 B1 | * | 6/2001 | Seshadri ..................... | 709/206 |

OTHER PUBLICATIONS

International Search Report; Nov. 28, 2000.

* cited by examiner

Primary Examiner—Thanh Cong Le
Assistant Examiner—Yemane Woldetatios
(74) Attorney, Agent, or Firm—Lyon & Lyon LLP

(57) ABSTRACT

A method of communicating FSK-modulated Caller ID signals through a network incompatible to the transmission of these signals is presented. A first network component couples between the incompatible network and a Central Office, and a second network component couples between the incompatible network and the telephone. In one embodiment, the call flow proceeds until the second network component would ring the line of the called party. The second network component seizes the line but does not apply a ringing signal. The second network component continues with the call flow as though the second network component had entered the silent interval after the first ring cycle at the called party. Subsequently, the CO transmits the FSK Caller ID information to the first network component which detects the FSK transmission and converts it into an out-of-band message and transmits the out-of-band message over the incompatible network to the second network component. Upon receipt of this out-of-band message from the first network component, the second network component converts it back into an in-band FSK Caller ID message, and delivers the FSK message during the first silent interval.

In another embodiment, the first network component, without sending signals to the second network component, initiates a call flow to the CO as though the second network component were entering the silent interval. Subsequently, the CO transmits the FSK Caller ID information to the first network component which detects the FSK transmission and converts it into an out-of-band message for transmission to the second network.

18 Claims, 9 Drawing Sheets

ON-HOOK TRANSMISSION OF MESSAGE WAIT INFORMATION

CALLER IDENTIFICATION DELIVERY IN A WIRELESS LOCAL LOOP OR OTHER SYSTEMS

INTRODUCTION

This invention relates to communications, and more particularly relates to systems and methods for supporting Caller Identification and related information delivery through networks incompatible to an in-band transmission of the Caller Identification information such as a wireless local loop system.

BACKGROUND OF THE INVENTION

Wireless local loop systems represent a significant improvement in telephone service by providing customers alternative access to public telephone networks. Users can continue to use familiar and convenient conventional telephone equipment yet communicate over a wireless communication link. A customer premises radio unit (CPRU) provides the interface between the conventional telephone equipment and the wireless communication link.

A number of technical challenges must be overcome, however, to successfully interface a conventional phone to a wireless communication link. For example, in a wireless environment, the digits in a complete telephone number are only transmitted to the central office after the user presses a SEND button or its equivalent. In contrast, conventional telephone equipment transmits the digits as they are dialed to the central office. Thus, a wireless local loop system may be required to, after generating a dial tone, perform digit analysis to determine that a complete telephone number has been dialed.

Another technical challenge involves delivery of Caller Identification (Caller ID or CID) in the wireline to wireless environment present in wireless local loop systems. Caller ID in a wireline environment is sent as an in-band transmission using FSK (frequency shift key) modulation. Caller ID is the generic term for several features that are a member of the Bellcore CLASS family of telephone services offered by local telephone companies for a monthly fee. Providing these services depends on the presence of Signaling System 7 (SS7) end-to-end in the network. SS7 is the signaling protocol used to communicate between central office switches. In the U.S. and Canada, Caller ID follows primarily the Bellcore documents GR-30-CORE (on-hook and off-hook data transmission), TR-NWT-000031 (Calling Number Delivery), TR-NWT-001-188 (Calling Name Delivery Generic Requirements), and TR-NWT-000575 (Calling Identity Delivery on Call Waiting). In a wireless local loop environment, such an FSK-modulated signal would be garbled upon transmission through the vocoders which are required at either end of the wireless transmission (for example, the base station and the CPRU). It is to be noted that other environments wherein an FSK-modulated Caller ID signal must be transmitted through an incompatible network will also encounter this problem. There is a need in the art for a wireless local loop system that is able to deliver Caller ID information to a conventional telephone despite the in-band nature of the Caller ID transmission.

SUMMARY OF THE INVENTION

The present invention comprises systems and methods for delivery of Caller ID information in suitable environments. These environments require the transmission of an FSK-modulated Caller ID signal from a Central Office (CO) to a telephone wherein a network incompatible to an in-band transmission of the Caller ID signal intervenes between the CO and the telephone. A first network component of the incompatible network couples to the CO, and a second network component of the incompatible network couples to the telephone. In the incompatible network, the first network component converts the FSK-modulated Caller ID signal received from the calling party into an out-of-band message for transmission over the incompatible network. The second network component receives the out-of-band message and converts the message into an FSK-modulated Caller ID signal for delivery to the called party. The present invention contemplates both on-hook and off-hook delivery of Caller ID information.

The present invention comprises two main embodiments for on-hook delivery of Caller ID information. In the first embodiment, denoted as "second network component directed," the call flow proceeds until the second network component would ring the line of the called party. The second network component seizes the line but does not apply a ringing signal. Although the line is not ringing, the second network component continues with the call flow as though the second network component had entered the silent interval after the first ring cycle at the called party. Subsequently, the CO transmits the FSK Caller ID information to the first network component which detects the FSK transmission and converts it into an out-of-band message and transmits the out-of-band message over the incompatible network to the second network component. Upon receipt of this out-of-band message from the first network component, the second network component converts it back into an in-band FSK Caller ID message, applies the first ring to the line and delivers the FSK message during the first silent interval between rings longer than three seconds. When the phone of the called party goes off-hook, voice traffic is established in a standard manner.

In the second embodiment for on-hook delivery of Caller ID information, denoted as "first network component directed," the first network component, without sending signals to the second network component, initiates a call flow to the CO as though the second network component were entering the silent interval between the first and second rings. Subsequently, the CO transmits the FSK Caller ID information to the first network component which detects the FSK transmission and converts it into an out-of-band message. After a communication link has been established between the first network component and the second network component, the Caller ID information is transmitted in an out-of-band message. The first network component may then begin ringing the line and transmitting the Caller ID message, after conversion into the FSK format, in the first silent interval.

One example of a network incompatible to an in-band transmission of FSK-modulated Caller ID signals is a wireless local loop system. A wireless local loop system provides a wireless link between customer premises equipment (CPE) and the public switched telephone network (PSTN). In wireless local loop systems, a number of different protocols may be used at the first and second network units. For example, the first network component may communicate with the CO of a public switched telephone network under a GR-303 protocol. The first and second network components may communicate with each other through a wireless network under, for example, a DECT or a GSM protocol. In one wireless local loop embodiment of the present invention, the CPE links to a customer premises radio unit (CPRU) which serves as the second network component.

The CPRU communicates over the wireless link to a base station. In turn, the base station may be controlled by a radio node controller (RNC) that serves as the first network component. The RNC connects to the public switched telephone network containing the central office (CO). With respect to this wireless local loop, the "first network component directed" embodiment would thus be an "RNC directed" embodiment and the "second network component directed" embodiment would be a "CPRU directed" embodiment.

On hook delivery of a Visual Message Waiting Indication (VMWI) is also provided for by the present invention. In this embodiment, an over the air connection is established between the first and second network components. Upon establishing the over the air connection, the first network component transmits the connection status to the CO which transmits the FSK-modulated VMWI information to the first network component. The first network component converts the FSK-modulated VMWI information into an out-of-band message and transmits it to the second network component. The second network component converts the out-of-band message back into an FSK-modulated VMWI form and transmits it to the called party.

The present invention also contemplates delivery of Caller ID during Call Waiting (CIDCW) while the phone of the called party is off-hook and an active call is in progress. An audible Subscriber Alerting Signal (SAS) and a CPE Alerting tone (CAS) are transmitted by the CO to the CPE and the Caller ID display device, respectively. After acknowledging receipt of the CAS, the Caller ID display device mutes the voicepath and begins a timer. Receiving this acknowledgement, the CO delivers the FSK-modulated Caller ID information to the first network component which converts the Caller ID information into an out-of-band message. The second network component, upon receipt of this out-of-band message, transmits another CAS signal to the Caller ID display device which by now will have timed-out. The CID display device again acknowledges receipt of the CAS signal and mutes the voicepath. After conversion of the out-of-band message into an FSK-modulated Caller ID message, the second network component transmits the Caller ID message to the Caller ID display device and then restores the voice path.

The above and other features and advantages of the present invention will become apparent from the following description and figures.

DETAILED DESCRIPTION

Figure 1:
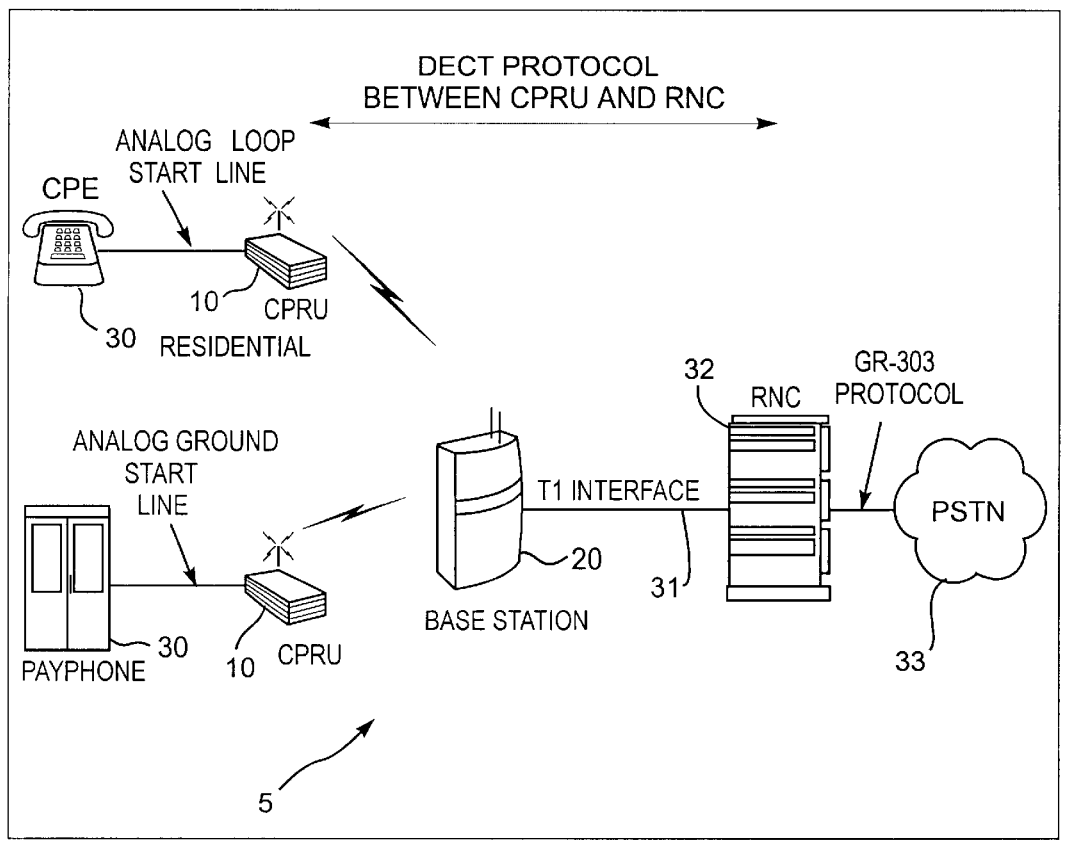
FIG. 1 is a block diagram of a wireless local loop communication system.

An example wireless local loop system 5 is shown in FIG. 1. A plurality of CPRUs 10 communicate over a radio link with a base station 20. Such communication can occur using any appropriate wireless communication technique and protocol including, but not limited to, frequency division multiple access (FDMA), code division multiple access (CDMA), spatial division multiple access (SDMA), time division multiple access (TDMA), or any combination of FDMA, TDMA, CDMA, and/or SDMA. CPRUs 10 may be universal radio converters (URCs) which transmit dialed digits substantially at the same time when the customer dials them, denoted as "overlap sending."

Standard non-wireless devices 30 (conventional wireline telephones) generically referred to herein as customer premises equipment (CPE) are coupled to the CPRUs 10. CPRUs 10 function so that customers using CPEs 30 believe they are using "plain old" telephone service (POTS) despite the fact that these customers are actually communicating over a wireless link.

Base station 20 is connected to a radio node controller (RNC) 32 by a wired (e.g. T1) interface line 31. Communication between CPRUs 10, base station 20 and RNC 32 may follow the DECT protocol. RNC 32 interfaces with the public switched telephone network via the telephone network central office (CO) 33 using, in one embodiment, GR-303 communication criteria.

Before addressing the features of the present invention as applied in, for example, the wireless local loop system 5, Caller ID delivery in conventional wireline telephone networks will be described so that the manner in which the present invention seamlessly transfers Caller ID between a wireline and a wireless environment will be appreciated. Caller ID service was initially conceived by AT&T/Bell Laboratories in the late 1970s. Following the breakup of AT&T, BellSouth and Bell Atlantic were the first companies, in 1984 and 1987 respectively, to offer Caller-ID service. Today, Caller-ID service is available in all 50 states and in most of Canada. Several other countries, including Australia, the U.K., France, the Netherlands, and Israel, deployed Caller ID in the 1995–96 time frame.

For technical and regulatory reasons, Caller ID, historically, was limited to identifying local callers. Long-distance calls were identified as "out of area." As a result of a March 1994 ruling by the FCC, Caller-ID services now operate with long-distance and 800 calls. The Telecommunications Act of 1996, ensured that switches provide the service. Caller ID is becoming available for long distance calls as the connecting switches are upgraded to be able to transmit this information.

In the U.S., Canada, Australia, and Israel, Caller ID is transmitted as a burst of a Bell 202 Frequency Shift Key (FSK) modem signal. Because this Bell 202 signaling is not a standard Bell 212 or CCITT V.22 data format, a standard modem is most likely not able to receive this signal. Furthermore, and most importantly, the serial information exists as such, only from the recipient's switch to the called parties location as a point-to-point transmission. Between carriers (i.e. CO's , long distance switches, or Inter Exchange Carriers (IXC)) the signal exists as out-of-band data packets in the Signaling System 7 (SS7) network.

The following table summarizes some basic characteristics of the FSK modulation used for Caller ID signaling.

| | |
|---|---|
| Link Type | 2-wire, simplex |
| Transmission Scheme | Analog, phase-coherent FSK |

-continued

| | |
|---|---|
| Mark (Logic 1) | 1200 ± 12 Hz |
| Space (Logic 0) | 2200 ± 22 Hz |
| Transmission Rate | 1200 bps ± 12 baud |
| Transmission Level | 30 dB below power of carrier frequency into 900 ohm load |

Caller ID is delivered in two possible formats, the Single Data Message Format (SDMF) (Type I), which provides the calling number, and the Multiple Data Message Format (MDMF) (Type II), which provides both the calling number and the subscriber name under which the number is listed, as well as the date and time. (U.S. only). Corresponding to the Type I is the "short form" type of Caller ID which contains the date and time of the call and the calling number or error message. Similarly, corresponding to the Type II is a "long form" type of Caller ID which also contains the name and possibly the address (directory information) of the calling party.

The Single Data Message Format (SDMF) contains from 1 to 255 8-bit words, not including the checksum. The checksum value contains the twos complement of the modulo 256 sum of the other words in the data message (i.e., message type, message length, and data words). The receiving equipment may calculate the modulo 256 sum of the received words and add this sum to the revived checksum word. A result of zero generally indicates that the message was correctly received. Message retransmission is not supported.

The SDMF stream for Calling Number ID (including the data link layer) consists of a set of null values, followed by a two byte prefix, followed by the DATE Month/Day), TIME (24 hour format), and number, including area code, in ASCII format (ANSI X. 28), followed by a checksum. The Multiple Data Message Format (MDMF) is also 8-bit words, the number of which is determined by the particular feature using the format. It consists of a similar format as SDMF with additional fields to the message.

If the calling party's directory number is not available to the terminating central office, the phone number field contains an ASCII 'O'. The conventional telephone equipment, also know as customer premises equipment (CPE), display will show "Out of Area" (or some equivalent) for the number. If the calling party invokes the privacy of Caller ID Restriction (blocking), the phone number field contains an ASCII 'P'. The CPE display will show "Caller ID blocked" (or some equivalent, for example, "Private") instead of the number.

The following table describes the message formats that are used based on the subscription and usage option of the user.

| Feature | Message Format |
|---|---|
| Calling Number Delivery | SDMF |
| Calling Name and Number | MDMF |
| Caller ID on Call Waiting | MDMF |

In addition to identifying the calling party, Caller ID includes two different Message Waiting Indication (MWI) types that the CO can send over the line interface to signal a phone or adjunct accessory that there is a new voice mail message. A user may subscribe to both forms, if desired. The first type is an Audible Message Waiting Indication (AMWI). An AMWI is a stutter dial tone (an interrupted dial tone) that is presented to the user when the user goes off-hook to inform that user that there is a waiting message. The FCC only allows devices to detect this after one of two events: 1) after the phone has been used, the user can go on-hook and then back off-hook and detect the tone within 30 seconds, and 2) within four minutes after the phone rings and goes unanswered.

The second type is a Visual Message Waiting Indication (VMWI). VMWI is an on-hook data transmission feature that activates and deactivates a visual indicator associated with the CPE notifying the user that new message(s) are waiting. The CPE must be at least a Class Type 1 capable equipment to support this feature. It is not associated with an active incoming call. If the user goes off-hook during a transmission of the VMWI, that transmission is aborted.

The visual indicator may be as simple as lighting or flashing a Light Emitting Diode (LED) or as advanced as displaying a special message on a liquid crystal display. For the CPRU to transmit the information via FSK modulation, the message waiting indication information needs to be stored on the CPRU until it is able to present this information to the CPE. The actual transmission timing requirements for this are described in the On-Hook Data Transmission without Power Ringing section of GR-30-CORE. The CO may transmit this information on a periodic basis of every 5 minutes, as a refresh to the indicator. This is also useful if the user does not have a Caller ID display box (they may have a lamp on the phone equipment itself). This does not work very well if mailbox to mailbox messaging is used because the Visual Message Waiting Indicator (VMWI) message is only delivered to the CPE when the called customer's line is in the idle state. It is coded to be sent in either SDMF or MDMF format, in accordance with the data transmission not associated with ringing, wherein the MDMF format is preferred.

Note that Caller ID transmission occurs in two different ways: 1) transmission of Caller ID with the CPE on-hook, and 2) transmission of Caller ID with the CPE off-hook. The transmission of Caller ID with the CPE on-hook will be addressed first.

On-Hook Transmission of Caller ID

On-hook transmission capabilities are transmitted during the idle state of the CPE. It is available with single party lines, CENTREX lines, Multi-line Hunt Groups and RSU lines. Multiparty lines, coin lines, credit card lines, and ground start circuits do not need to support on-hook transmission capabilities. On-hook transmission may be associated with or without power ringing.

1) Calling Number Delivery

Calling number delivery occurs during an idle state of the line to the CPE and is associated with power ringing. The FSK information is delivered in ASCII format and is transmitted during the silent period between the first and second ringing cycles on analog loop-start lines only. For those telephone sets with distinctive ring capabilities, it is transmitted the during the first long silent interval that is 3 seconds or longer. For each bit, the displacement from the center frequency has a separate tone.

The on-hook signal is provided before the circuit is complete. Thus, going off-hook on the receiver before the data stream is finished (i.e. before the second ring has started) will stop/corrupt the transmission. The Caller ID signaling must wait until at least 500 ms after the first ring burst has completed and will end at least 200 ms before the second ring burst begins. If distinctive ringing is being applied to the line, then the information needs to be able to fit into the first long (i.e. less than 3 seconds) interval. However, there may be some ringing patterns where the silent interval is too short to send a fall data message. Normal line supervision should be continuously applied between the tip and ring conductors during the transmission. The ring current is 90 V at 20 Hz and supplied by a ring generator at the CO. Note that in a wireless local loop application, the CPRU will need to supply this ring current.

2) Calling Party Name Delivery

The calling party name is not sent as part of call origination. It is only when the terminating switch receives an incoming call and determines that the terminating party subscribes to the CID feature that a query is sent to the Centralized Residence Name Database to obtain the name information, which can include a vanity name if supported by the local telephone company. Also included with the name is the date and time of the call. Although Calling Name is a separate feature, it is generally packaged by the local operator with the calling number in a generic Caller ID feature offering. This feature is available for both Dial Pulse or Dual Tone Multi-Frequency (DTMF) POTS (Plain-Old-Telephone-Service) lines.

The name information is placed in the Caller ID message, if available, using MDMF format and delivered to the terminating party. The name may be up to 15 characters in length. In the present invention, the CPRU sends the name and calling party number to the CPE equipment using the FSK protocol between the first and second power ring cycles. For those phones with distinctive ring capabilities, the information is delivered during the first long silent interval that is at least 3 seconds in duration. The Calling Party Name may not be supported for off-hook transmission. This affects Caller ID for Call Waiting (CIDCW).

Off-Hook Transmission

Off-hook transmission involves Caller ID for Call Waiting (CIDCW). This feature uses a more sophisticated calling number protocol. The CPE must be at least a Class Type 2 capable equipment to support this feature. CIDCW involves the delivery of calling party information during an existing call. Voice audio is suppressed during the delivery of the information. To transmit FSK data (the Caller ID information) in the off-hook condition, a stable call must be interrupted, and a clear, voice-free channel needs to be established to accommodate the transmission of the FSK information. This requires precise timing in the suppression of the voice channel, sending the Caller ID information, and restoration of the voice path with inconsequential inconvenience to the user.

The CO sends the CPE Alerting Signal (CAS) and Subscriber Alerting Signal (SAS) back-to-back. Since CIDCW will only take place if a call is already in progress, there will never be a ring signal preceding the message. The SAS tone is mainly for the user and is not required for the CPE to receive the CID information. The SAS can be either a single frequency of 440 Hz that is applied for approximately 300 ms or a distinctive alerting pattern. This is the tone that is heard when a call is in progress and call waiting beeps to indicate a second call. The SAS tone is followed by the CO sending a CPE Alerting Signal (CAS), a two-tone signal of 2130 Hz and 2750 Hz that is 80–85 ms in length.

If the customer's Caller ID equipment is ready to receive the Caller ID information, it responds to the CAS by sending the central office an acknowledgment (ACK) signal. This ACK signal has a nominal tone duration of 60 ms and can be either a Dual-Tone Multi-frequency (DTMF) "A" or a DTMF "D". The DTMF "D" is the most common ACK signal. Note that the CPE will only respond to the CAS signal if it is the only extension that is off-hook. If someone else is involved in the call on another extension, the CPE will not send an ACK signal to the central office because it cannot mute the second device.

The CO subsequently detects the ACK tone sent by the subscriber equipment that indicates that it has muted the voice receiver for the period that the FSK will be sent. The muting serves two purposes. First, it keeps the called party from hearing the FSK signal. Second, it avoids the interference from speech and other noises that would be picked up by the telephone's microphone. Before sending the CAS, the CO momentarily removes audio to and from the far end of the current call. The remote party often perceives this as a momentary "click" on the line. Once the central office receives the ACK signal it sends the FSK data. The CPE Caller ID display box un-mutes the handset when either it has finished receiving the FSK signal or when the CPE CID box times out. The CO reconnects the audio to the far end after the FSK data has been transmitted.

If the ACK signal from the called CPE is not received at the CO within 165 ms, no Caller ID information is delivered. The CO may take from 50 to 500 ms after detection of the ACK before it begins transmitting the FSK information, with an average time delay of 100 ms. The timing for this information is critical and detailed timing requirements are necessary for the feature to work properly. Bellcore GR-30-CORE specifies that the time period that the CO suppresses the voice path not exceed 1.2 seconds. This excludes the duration of the SAS and FSK data information transmission.

CIDCW may alert a customer with a SAS tone up to two times, for a call received while the customer is in a stable call state. A second alerting is provided when the customer has not responded by flashing or disconnecting within a 10 second timeout period. If the user flashes or disconnects while the FSK information is being transmitted, the transmission is stopped.

Call Flow if Caller ID is not Subscribed to by the CPE

Figure 2:
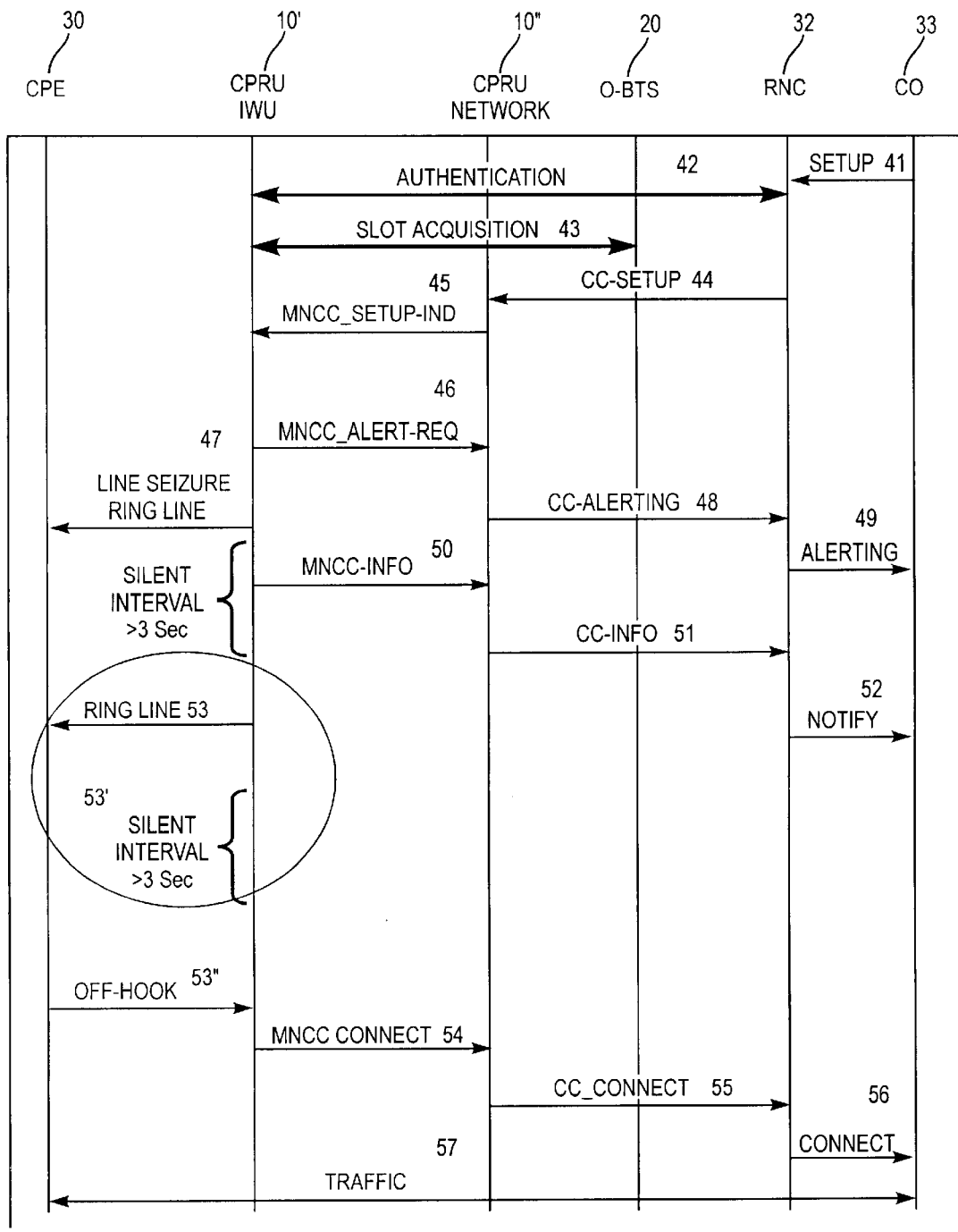
FIG. 2 illustrates a call flow wherein Caller ID is not subscribed to by the CPE.

Turning now to FIG. 2, a flow diagram for an incoming call to a CPE 30 if Caller ID is not subscribed to is illustrated. In all the flow diagrams, Authentication is shown as a prelude to obtaining an over the air slot. It is shown for convenience for a way to initiate an over the air slot acquisition at the base station. In addition, in all the call flows illustrated, it is assumed that the CPRU-CPE connection is an analog loop-start connection. Moreover, in all the call flows illustrated, it is assumed that communication among the RNC 32, the base station 20 and the CPRU 10 occurs observing the DECT protocol. Finally, in all the call flows illustrated, it is assumed that the RNC 32 and the CO 33 communicate according to the Bellcore GR-303 protocol.

At step 41, an incoming call request is received by RNC 32 from the CO 33 with the terminating party's number and ringing type to be presented to the CPE 30.

Optionally, at step 42, the RNC 32 requests Authentication of the CPE 30. At step 43, an over the air slot is obtained to process the Authentication as well as for the incoming call. A CC-SETUP message with associated information is passed to the CPRU network layer 10" at step 44. In turn, at step 45, the CPRU network layer 10" passes the SETUP information on to the CPRU Interworking Unit (IWU) 10'. Then, at step 46, the CPRU IWU 10' acknowledges receipt of the SETUP with an ALERTING request. Subsequently, the CPRU IWU 10' seizes the CPE 30 line and commences ringing the line at step 47. In step 48, the CPRU Network layer 10" passes the CC-ALERTING information back to the RNC 32 which in turn passes the ALERT information back to the CO 33 at step 49. The CPRU IWU layer 10' passes the MNCC-INFO request with proprietary information to the CPRU network layer 10" indicating that it has entered the silent interval after the first ring cycle at the CPE 10 in step 50. At step 51, the CPRU network layer 10" passes this information on to the RNC 32 which passes the silent interval information to the CO 33 in a NOTIFY message at step 52. At step 53, the CPRU IWU layer 10' rings the line again followed by the next silent interval at step 53'. Steps 53 and 53' are repeated until the CPRU IWU layer 10' detects the CPE 30 going off-hook in step 53" whereupon the CPRU 10 removes the ringing and the off-hook condition is transmitted to the CPRU network layer 10" via an MNCC CONNECT message in step 54. At step 55, the CPRU network layer 10" sends the off-hook CC-CONNECT message to the RNC 32 which passes the CONNECT information to the CO in step 56. Finally, at step 57, 2-way voice traffic commences.

The call flow illustrated in FIG. 2 must be modified should the CPE subscribe to the Caller ID feature. In accordance with the present invention, the Caller ID information is transmitted out-of-band so as to avoid vocoder garbling. Because the RNC 32 must detect and convert the FSK Caller ID information, there will be an approximate 500 ms delay introduced at the RNC 32 before the Caller ID information is forwarded. It is to be noted that this delay presents some timing issues because the Caller ID information must be delivered to the CPE 30 in the first silent interval. Pursuant to the present invention, two alternate embodiments exist to deliver Caller ID information with the CPE 30 in an on-hook condition.

In the first embodiment, denoted as CPRU directed, the standard call flow proceeds until the CPRU IWU receives the SETUP message. The CPRU IWU seizes the line but does not apply a ringing signal. Although the line is not ringing, the CPRU mimics the standard call flow as though the CPRU had entered the silent interval after the first ring cycle at the CPE. The RNC notifies the CO that it is ready for the FSK information and mutes the vocoders. Subsequently, the CO transmits the FSK Caller ID information to the RNC which detects the FSK transmission and converts it into an out-of-band message. After the FSK information has been transmitted to the RNC, it unmutes the vocoders. It is to be noted that vocoders are located at both the RNC and the CPRU sides of the wireless channel. Thus, as used herein, "vocoder" used in conjunction with the RNC shall denote the vocoder(s) located on the RNC side of the wireless channel. Similarly, "vocoder" used in conjunction with the CPRU shall denote the vocoder(s) located on the CPRU side of the wireless channel.

Upon receipt of the out-of-band message, the CPRU converts it back into an in-band FSK Caller ID message, applies the first ring to the line and delivers the FSK message during the silent interval, after muting the vocoder. After delivering the FSK message, the CPRU unmutes the vocoder. The ringing cycle of the line continues until the CPE goes off-hook, at which point the CPRU removes the ringing on the line and voice traffic is established in the standard manner.

Figure 3A:
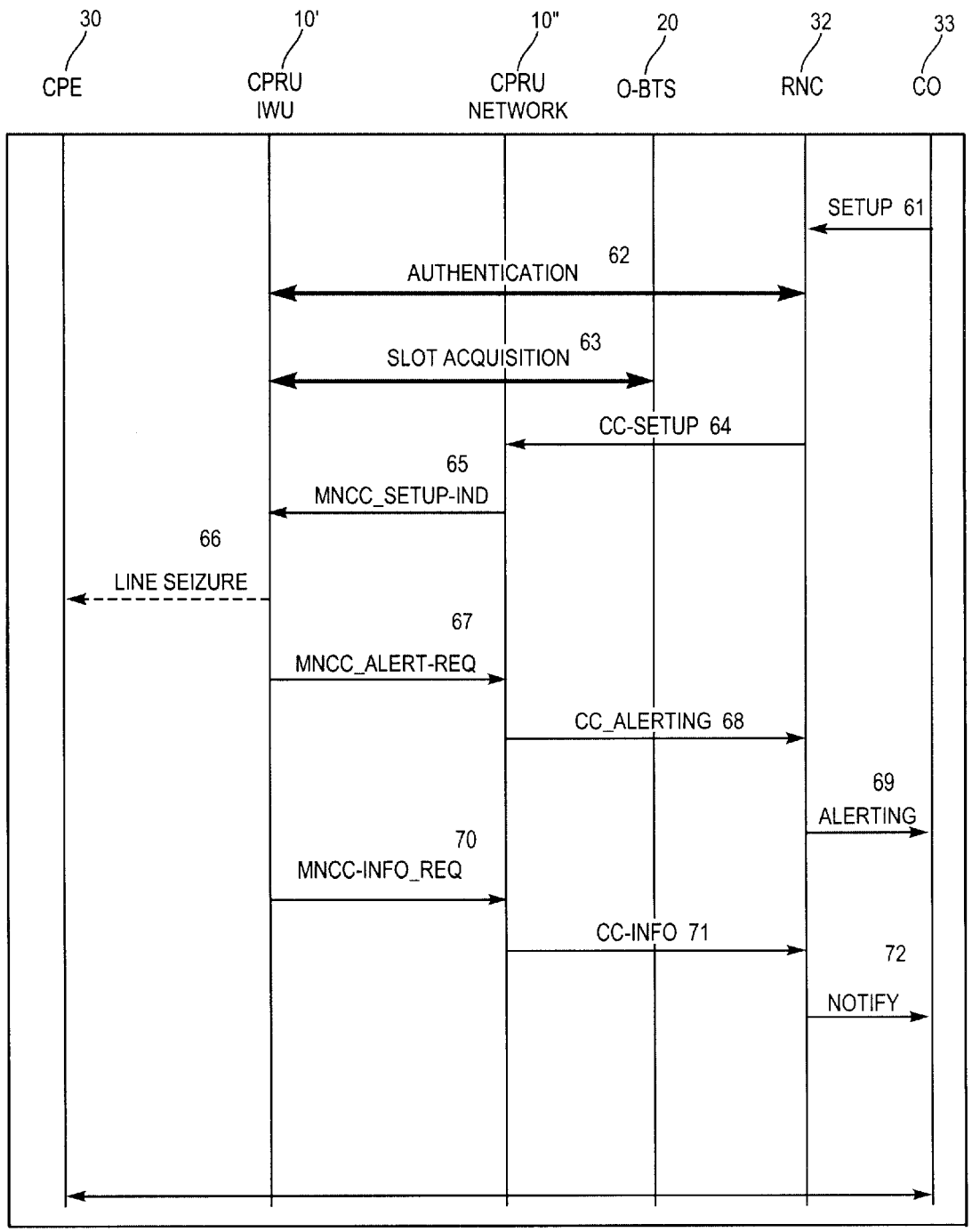
FIGS. 3a and 3b illustrate a call flow wherein the CPRU directs the on-hook delivery of Caller ID information according to one embodiment of the invention.
Figure 3B:
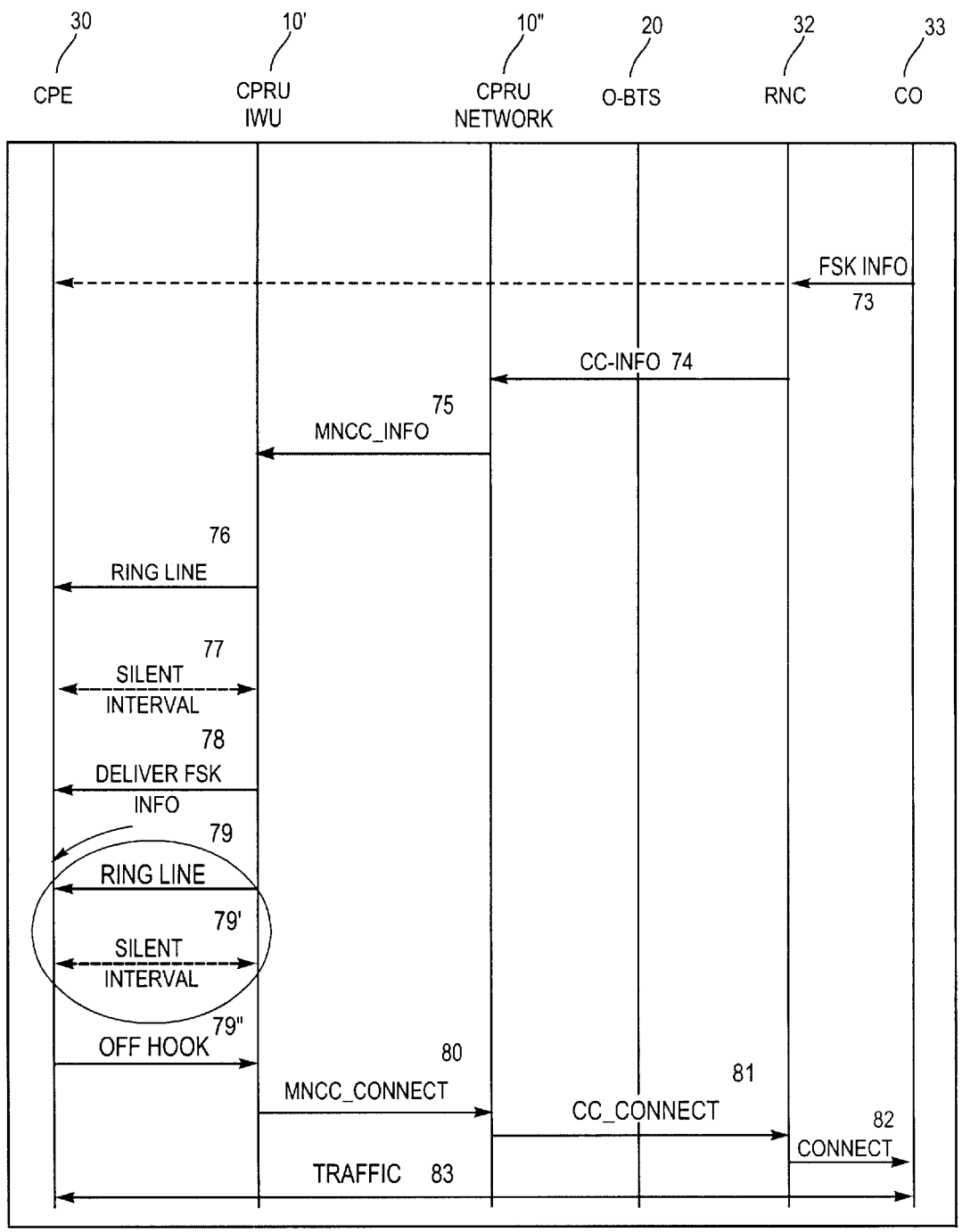

Turning now to FIGS. 3*a* and 3*b,* a call flow diagram is illustrated for the CPRU directed embodiment. The call flow proceeds in steps 61 through 65 similarly as described in steps 41 through 45 with respect to FIG. 2. At step 66, however, the CPRU IWU 10' seizes the CPE 30 line but does not apply a ringing signal. Although the CPRU did not apply a ringing signal, it will mimic the standard call flow as though a ringing signal had been applied. Thus, the call flow proceeds in steps 67 through 72 similarly as described in steps 46, and 48 through 52, respectively. At step 73, the RNC 32 suppresses the vocoder in the event that the called party goes off-hook during the FSK transmission. Similarly, the CO 33 suppresses the voice path to the far end listening to ringback, so that garbled FSK information will not be heard, and begins transmission of the FSK information to the RNC 32. At step 74, after receipt of all the FSK information, the RNC 32 unmutes the vocoder and transmits the FSK information to the CPRU network layer 10" in a CC__INFO message. In response, the CPRU network layer 10" passes the Caller ID information, contained in the INFO message to the CPRU IWU 10' in step 75. Then the CPRU 10 commences the ringing cycle at the CPE 30 in step 76. At step 77, between the first and second ring, there is a four second "silent interval". For distinctive ringing, the silent interval is the first long silent period greater than 3 seconds. The FSK information is delivered to the CPE 30 during this silent interval in step 78. The CPRU 10 also mutes the voice path to the far end receiving ringback. After delivery of the FSK information, the CPRU 10 unmutes the voice path. At step 79, the CPRU 10 rings the line again, followed by the next silent interval at step 79'. Steps 79 and 79' are repeated until, at step 79", the CPRU 10 notes when the CPE 30 goes off-hook and removes the ringing. At step 80, the off-hook condition is transmitted to the CPRU network layer 10' via an MNCC__CONNECT message. In turn, the CPRU network layer 10' sends a off-hook CC__CONNECT message to the RNC 32 at step 81. At step 82, the RNC 32 passes the CONNECT information to the CO 33. Finally, at step 83, cut through is established and 2-way voice traffic commences.

Note that because the line has already been seized for the call, if the CPE 30 equipment goes off-hook after step 66 and before step 78 has been completed, then the FSK information transmission is aborted. The voice path is unmuted at both the CO 33 and RNC 32, the CPRU 10 sends the connect messaging, and the call is cut through.

In the second embodiment of the present invention, denoted as RNC directed, the RNC, without sending signals to the CPRU 10, initiates a call flow to the CO as though the CPRU were entering the silent interval between the first and second rings. Subsequently, the CO transmits the FSK Caller ID information to the RNC which detects the FSK transmission and converts it into an out-of-band message. After an over-the-air link has been established between the RNC and the CPRU, the Caller ID information is transmitted in an out-of-band message. The CPRU may then begin ringing the line and transmitting the Caller ID message, after conversion into the FSK format, in the silent interval.

Figure 4A:
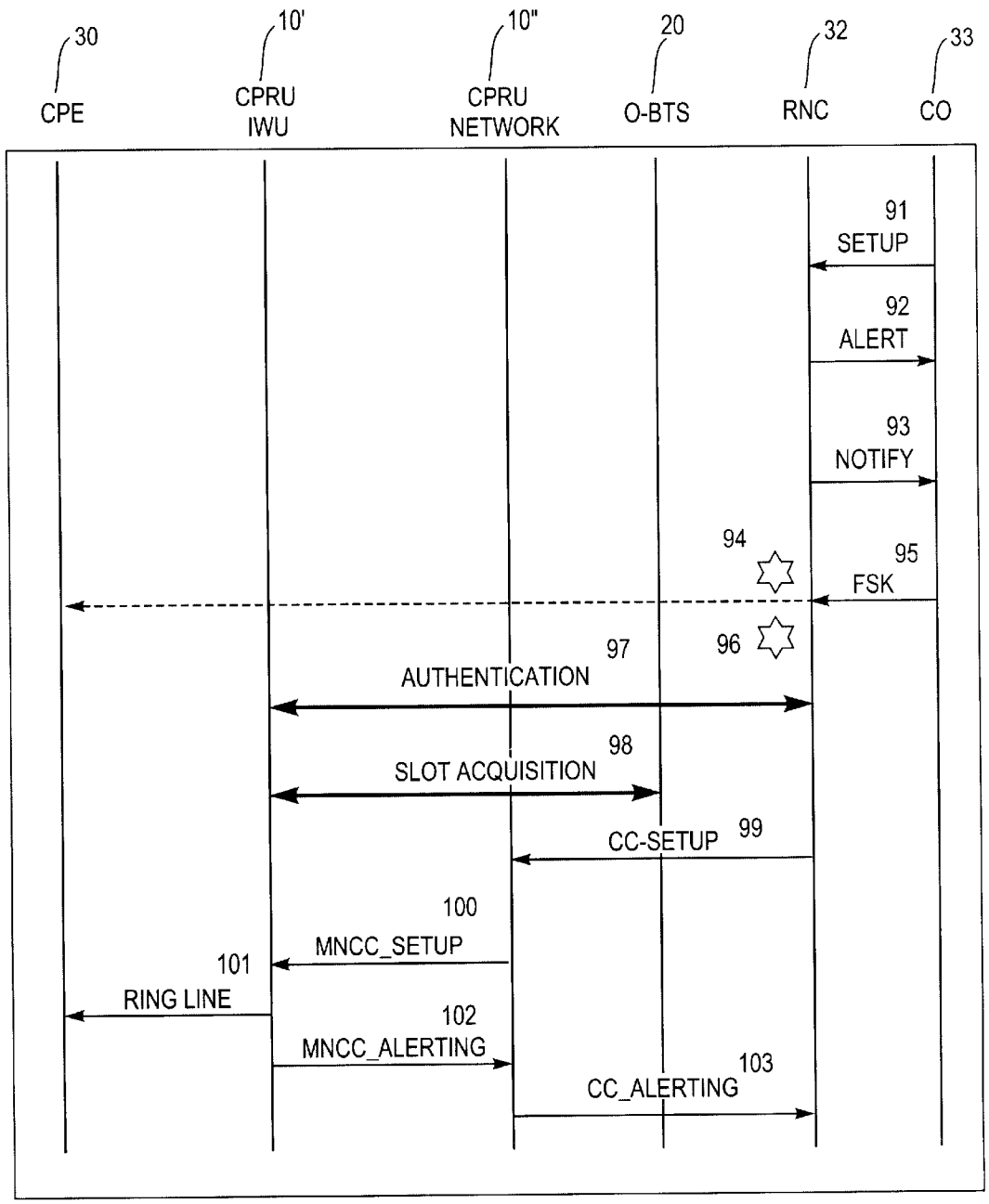
FIGS. 4a and 4b illustrate a call flow wherein the RNC directs the on-hook delivery of Caller ID information according to one embodiment of the invention.
Figure 4B:
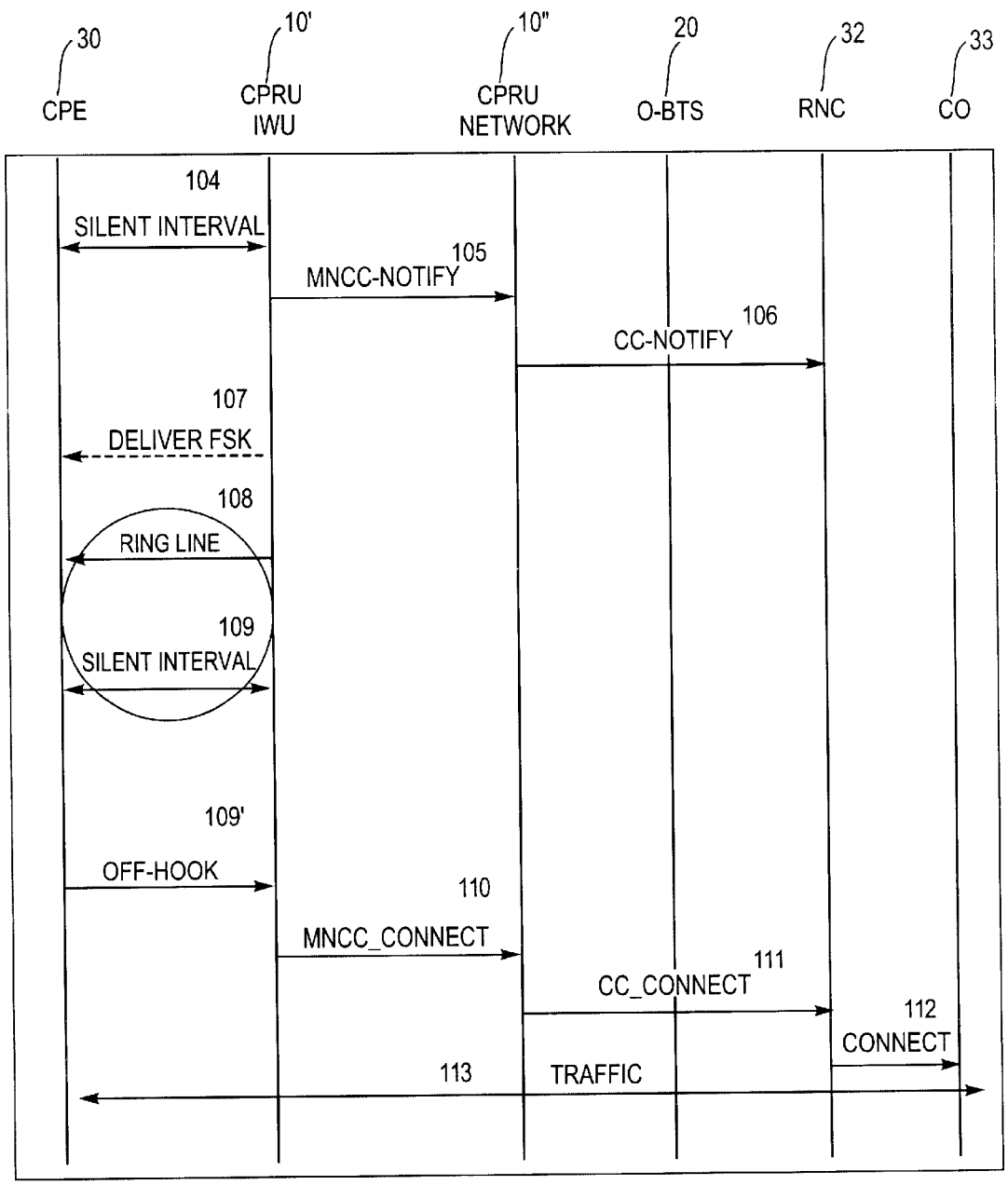

Turning now to FIGS. 4*a* and 4*b,* the call flow for the RNC directed embodiment is illustrated. At step 91, an incoming call request is received by the RNC 32 from the CO 33 with the terminating party's number and ringing type to be presented to the CPE 30. Without forwarding any call information to the CPRU 10, the RNC 32, sends back an ALERT message to the CO 33 in order to obtain the FSK information at step 92. Thus, at step 93, the RNC 32 then sends a NOTIFY message to the CO 33 to "trick" the CO 33 into "thinking" that the CPE 30 is in the silent interval to obtain the FSK information. Preparing to receive the FSK information, the RNC 32 mutes the vocoder at step 94. At step 95, the CO 33 transmits the FSK information and mutes the voice path to the far end. After receipt of the FSK information, the RNC unmutes the vocoder at step 96. Optionally, at step 97, the RNC requests Authentication of the CPE 30 (i.e. CPRU 10 ). Next, the base station 20 obtains an over the air slot to process the Authentication at step 98. At step 99, the RNC 32 transmits the CC-SETUP message to the CPRU network layer 10" containing the Caller ID information that was in the FSK transmission. (Called Party Number Information Element, the date and time and if applicable, the Display Information Element). The Signal Information Element is sent containg the ringing cadence information. In response, the CPRU network layer 10" passes the incoming SETUP message to the CPRU IWU 10' at step 100. Next, at step 101, the CPRU 10 applies ringing current on the CPE 30. In turn, the CPRU IWU 10' passes the ALERTing information to the CPRU network layer 10" at step 102. At step 103, the CPRU network layer 10" passes the CC-ALERTING message back to the RNC 32 indicating that ringing of the CPE 30 has commenced. The RNC 32 notes this as the CPRU 10 having received the SETUP message, but passes no message to the CO 33. In step 104, the silent interval between the first and second rings at CPE 30 commences. The CPRU IWU 10' passes the "silent" information in a MNCC_NOTIFY message to the CPRU network layer 10" at step 105. In response, at step 106, the CPRU network layer 10" sends a CC_NOTIFY message to the RNC 32 to indicate the silent interval. Note that for distinctive ringing, the silent interval is the first long silent period greater than 3 seconds. The RNC 32 notes the receipt of the message, but performs no action. At step 107, the FSK information obtained in the SETUP message is delivered to the CPE 30 during this silent interval. The CPRU 10 also mutes the voice path to both far and near ends of the connection. After delivery of the FSK information, the CPRU 10 unmutes the voice path. After delivery of the FSK information, the CPRU IWU 10' begins the next ring cycle of the CPE 30 at step 108, followed by the next silent interval at step 109. Steps 108 and 109 are repeated until the CPRU 10 notes when the CPE 30 goes off-hook at step 109. Finally, steps 110 through 113 occur similarly as described with respect to steps 80 through 83 with respect to FIG. 3b so that voice traffic commences.

Note that if the CPE 30 goes off-hook any time after step 101, a CONNECT message is passed back, the CPE 30 is cut through on the connection and FSK transmission is aborted. If the CPE goes off-hook after step 91 and before step 101, it is treated as a glare condition. The call should be treated as the "network always wins", and the call should be cut through to the calling party, if possible.

Figure 5A:
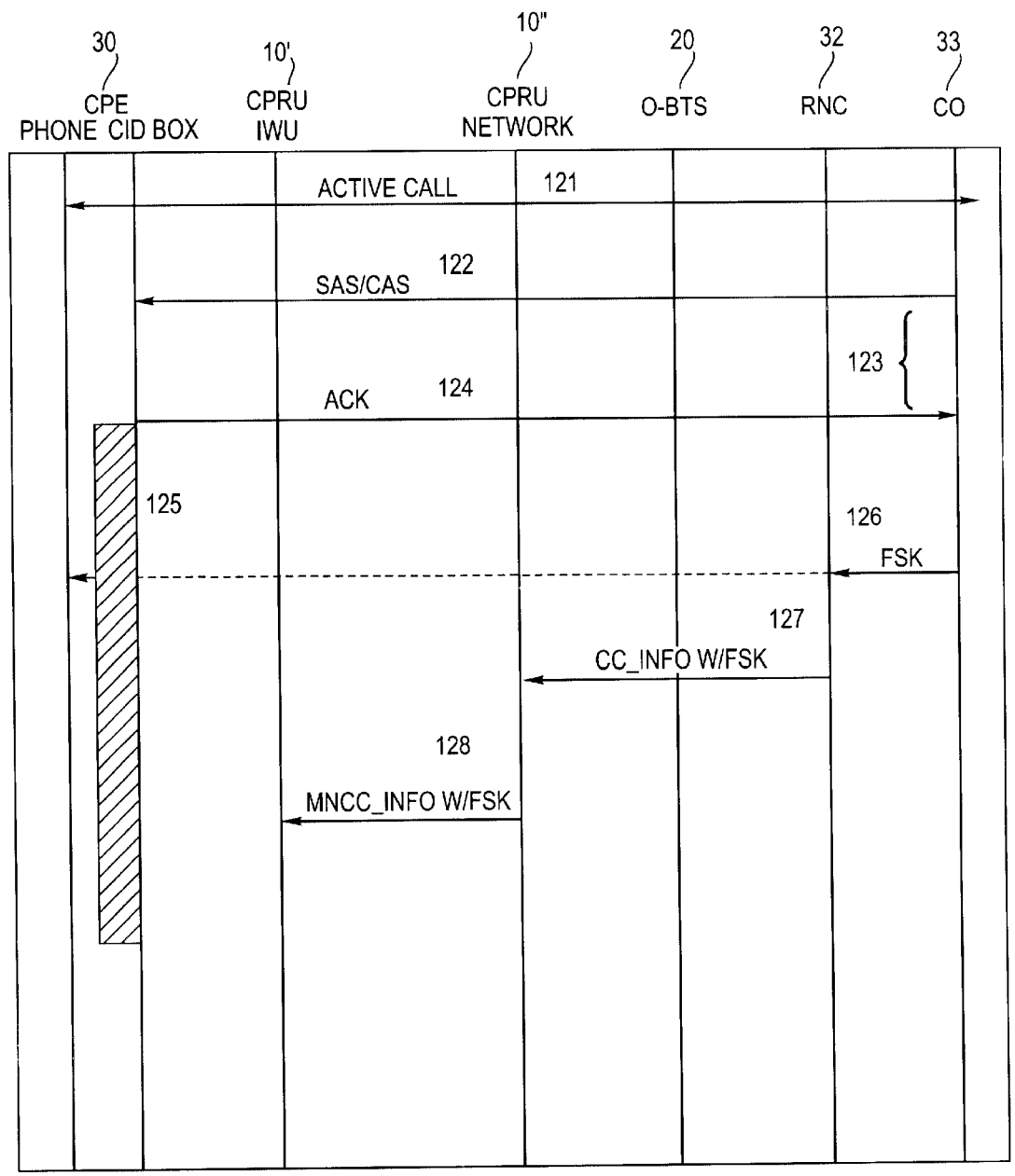
FIGS. 5a and 5b illustrate a call flow wherein Caller ID for Call Waiting information is delivered off-hook according to one embodiment of the invention.
Figure 5B:
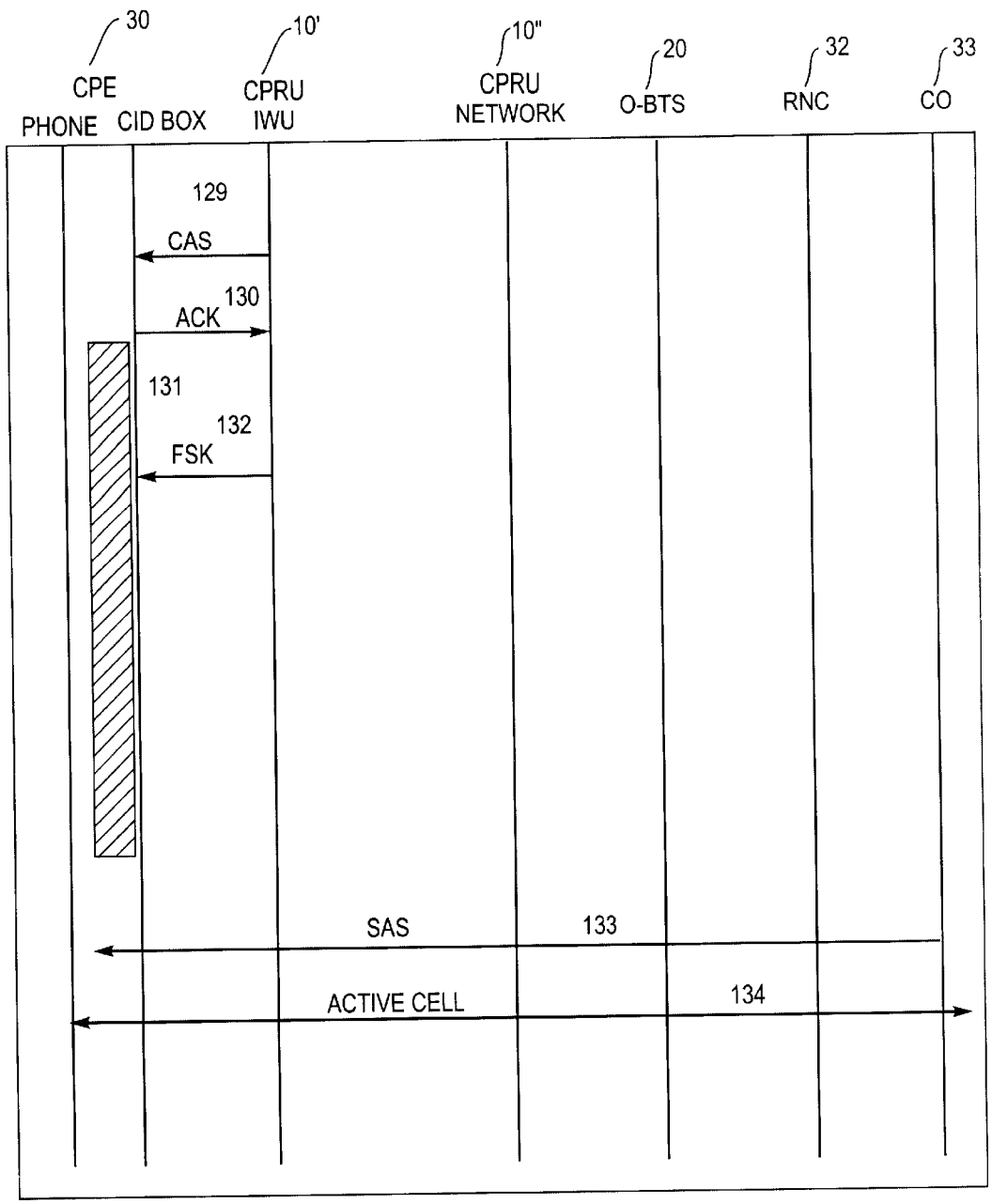

The present invention also contemplates an embodiment in which Caller ID Delivery During Call Waiting (CIDCW) is transmitted while the CPE 30 is in the off-hook condition. Turning now to FIGS. 5a and 5b, a call flow for this embodiment is illustrated. As shown in step 121, an active call must be in progress for this feature to be activated. Next, at step 122, the CO 33 sends an audible Subscriber Alerting Signal (SAS) to inform the user that there is a new incoming waiting call. Also the CO 33 sends a CPE Alerting tone (CAS) to the Caller ID display box to indicate that there is information to be sent. Both ends of the voice path are muted by the CO while the CAS is being sent. Ringback is then applied to the new caller at the far end by the CO. At step 123, A 10 second timer is set at the CO 33 to wait for the CPE 30 Caller ID display box acknowledgement message. If this timer times out, the call flow proceeds directly to step 133. Note that no acknowledgement by the CPE 30 Caller ID display box is generally indicative that there is an additional extension that is off-hook. Upon receipt of the CAS, if there is no extension off-hook, the CPE 30 Caller ID (CID) display box returns an ACK tone at step 124. Upon sending the ACK, the CPE 30 CID box mutes the phone and disables the keypad at step 125. In addition, the CPE 30 CID box starts a timer. The time period for this timer is 501 ms.

At step 126, the CO 33, having received the ACK, mutes the far end party voice path and transmits the FSK information. After receiving all of the FSK information, the RNC 32 transmits the FSK information in an out-of-band CC_INFO message to the CPRU networking layer 10' at step 127. Also, the CO 33 unmutes the far end party at this time. In turn, the CPRU network layer 10" relays the FSK information to the CPRU IWU 10' in an MNCC_INFO message at step 128.

By this time, the CPE 30 CID box has timed out on the muting and voice path has been restored. Therefore, at step 129, the CPRU IWU 10' sends the CAS tone to the CID display box at the CPE 30 to mute the voice path to the called party. At the same time, the CPRU 10 mutes the far end voice path. The CPE 30 CID box will respond with an ACK to indicate it is ready to receive the transmission at step 130. Once again, at step 131, upon sending the ACK, the CPE 30 CID display box mutes the phone, disables the keypad and begins a timer. The time period for this timer is 501 ms. In turn, the FSK tones are regenerated and transmitted to the CPE 30 CID box at step 132. Upon completion of the FSK transmission, the CPRU 10 unmutes the far end party voice path. If the CO timer in step 123 times out (a 10 second timer) and the called party has not performed any action, only the SAS tone is retransmitted at step 133. Step 133 is performed only if the timer has not timed out. Finally, at step 134, the call returns to the active state. At this point the user may choose to ignore the incoming call, flash to answer the call, or disconnect.

Figure 6:
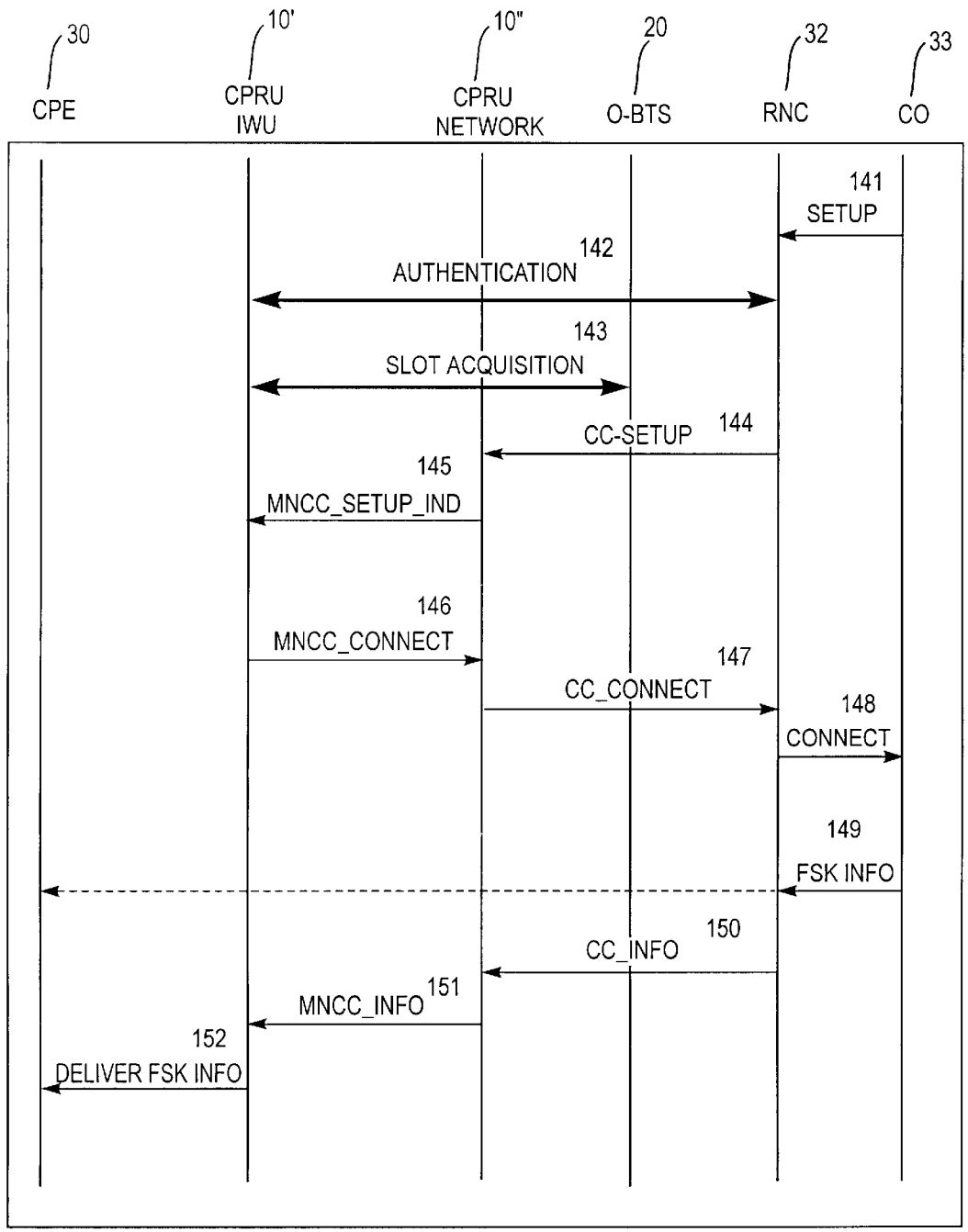
FIG. 6 illustrates a call flow wherein Message Wait information is delivered on-hook according to one embodiment of the invention.

The present invention also contemplates delivery of a Visual Message Waiting Indication while the CPE is on-hook. Turning now to FIG. 6, the call flow for such an embodiment is illustrated. At step 141, an incoming non-call request is received by the RNC 32 from the CO 33 with the terminating party's number and message indicator indication in the SETUP message. In response, at step 142, the RNC 32 requests Authentication of the CPE (i.e. CPRU) (this step is an optional procedure). At step 143, an over the air slot is obtained to process the Authentication and accommodate the incoming message transmission. Next, the CC-SETUP message with associated information is passed to the CPRU network layer 10" at step 144. At step 145, the CPRU network layer 10" passes the SETUP information on to the CPRU IWU 10'. In response, the CPRU IWU 10' acknowledges receipt of the SETUP with a CONNECT request at step 146. The CPRU network layer 10" passes the CONNECT information back to the RNC 32 at step 147. In turn, the RNC 32 acknowledges the CC_SETUP message with a CONNECT message to CO 33 at step 148. At this time, in preparation of receipt of the FSK transmission, the RNC mutes the vocoder. At step 149, as the CO transmits the FSK information to the RNC 32. The RNC 32 interprets the FSK information and places the information into a CC-INFO message to send to the CPRU network layer 10" at step 150. The RNC 32 also unmutes the vocoder. At step 151, the network layer of the CPRU 10 passes the information to the IWU layer of CPRU 10. Finally, at step 152, the CPRU 10 mutes the vocoder and FSK transmission is conveyed to the CPE 30 equipment. After completion of the FSK transmission, the vocoder is unmuted.

Note that if the user goes off-hook at any time during the transmission, it is aborted, and the off-hook indication is passed to the CO 33 as if the CPE 30 was going to originate a call. The vocoder is unmuted as well.

While the call flows discussed with respect to FIGS. 2 through 6 have pertained to a wireless local loop system, those of ordinary skill will appreciate that the principles of the present invention may be applied to other systems wherein Caller ID signals must be transmitted over an incompatible network by converting the Caller ID signals into an out-of-band transmission. Thus, while various embodiments of the present invention have been described above, it should be understood that they have been presented by way of example only, and not limitation. The breadth and scope of the present invention should not be limited by any of the above-described exemplary embodiments, but should be defined only in accordance with the following claims and their equivalents.

I claim:

1. A method of delivering an on-hook FSK-modulated Caller ID message from a CO to a telephone comprising the steps of:
   providing an incompatible network coupled between the CO and the telephone wherein a first network component of the incompatible network couples to the CO and a second network component of the incompatible network couples to the telephone;
   establishing a communication link through the incompatible network between the first network component and the second network component;
   communicating falsely to a CO that the second network component has begun a first ring cycle at the telephone after said establishing step has been accomplished;
   transmitting an FSK-modulated Caller ID message from the CO to the first network component;
   converting the FSK-modulated Caller ID message into an out-of-band message;
   communicating the out-of-band message through the communication link to the second network component;
   converting the out-of-band message at the second network component into the FSK-modulated Caller ID message; and
   transmitting the FSK-modulated Caller ID message from the second network component to the telephone during a silent interval.

2. The method of claim 1 wherein the first network component is an RNC, the second network component is a CPRU, and the incompatible network is a wireless local loop system.

3. The method of claim 2 wherein the CPRU communicates with the RNC according to the DECT protocol, and the RNC communicates with the CO according to the GR-303 protocol.

4. The method of claim 1 wherein the silent interval comprises a first silent period between rings of the telephone that is of 3 seconds or longer duration.

5. The method of claim 2 wherein the out-of-band message comprises a CC_SETUP message.

6. A method of delivering an on-hook FSK-modulated Caller ID message from a CO to a telephone through an incompatible network comprising the steps of:
   providing an incompatible network coupled between the CO and the telephone wherein a first network component couples between the incompatible network and the CO and a second network component couples between the incompatible network and the telephone;
   communicating falsely to the CO that the second network component has initiated a first ring cycle at the telephone before establishing a communication link through the incompatible network between the first and second network components;
   transmitting an FSK-modulated Caller ID message from the CO to the first network component;
   converting the FSK-modulated Caller ID message into an out-of-band message;
   establishing a communication link through the incompatible network between the first network component and the second network component;
   communicating the out-of-band message through the communication link to the second network component;
   converting the out-of-band message at the second network component into the FSK-modulated Caller ID message; and
   transmitting the FSK-modulated Caller ID message from the second unit to the telephone during a silent interval.

7. The method of claim 6 wherein the first network component is an RNC, the second network component is a CPRU, the incompatible network is a wireless local loop system.

8. The method of claim 7 wherein the CPRU communicates with the RNC according to the DECT protocol, and wherein the RNC communicates with the CO according to the GR-303 protocol.

9. The method of claim 6 wherein the silent interval comprises a first silent period between rings of the telephone that is of 3 seconds or longer duration.

10. The method of claim 7 wherein the out-of-band message comprises a CC_SETUP message.

11. A method of delivering an off-hook Caller ID message through an incompatible network to a telephone having a Caller ID display device comprising the steps of:
   providing an incompatible network coupled between the CO and the telephone wherein a first network component couples between the incompatible network and the CO and a second network component couples between the incompatible network and the telephone;
   establishing an active call on the telephone;
   transmitting a first CAS signal from the CO to the Caller ID display device;
   transmitting an acknowledgement signal from the Caller ID display device to the CO;
   communicating the FSK-modulated Caller ID message from the CO to the first network component after receipt of the acknowledgment signal at the CO;
   converting the FSK-modulated Caller ID message to an out-of-band message at the first network component;
   communicating the out-of-band message from the first network component to the second network component through the incompatible network;
   transmitting a second CAS signal from the second network component to the Caller ID display device;
   communicating an acknowledgment of the second CAS signal from the Caller ID display device to the second network component;
   converting the out-of-band message at the second network component into an FSK-modulated Caller ID message; and
   transmitting the FSK-modulated Caller ID message to the Caller ID display device.

12. The method of claim 11 wherein the first network component is an RNC, the second network component is a CPRU, and the incompatible network is a wireless local loop system.

13. The method of claim 12 wherein the CPRU communicates with the RNC according to the DECT protocol, and wherein the RNC communicates with the CO according to the GR-303 protocol.

14. The method of claim 13 wherein the out-of-band message comprises a CC_SETUP message.

15. A method of delivering an on-hook FSK-modulated Visual Message Waiting Indication from a CO to a telephone comprising the steps of:

providing an incompatible network coupled between the CO and the telephone wherein a first network component couples between the incompatible network and the CO and a second network component couples between the incompatible network and the telephone;

establishing a communication link between the first and second network components through the incompatible network;

communicating the FSK-modulated Visual Message Waiting Indication from the CO to the RNC;

converting the FSK-modulated Visual Message Waiting Indication at the first network component into an out-of-band message;

communicating the out-of-band message to the second network component through the communication link;

converting the out-of-band message at the second network component into an FSK-modulated Visual Message Waiting Indication; and transmitting the FSK-modulated Visual Message Waiting Indication from the second network component to the telephone.

16. The method of claim 15 wherein the first network component is an RNC, the second network component is a CPRU, the incompatible network is a wireless local loop system.

17. The method of claim 16 wherein the CPRU communicates with the RNC according to the DECT protocol, and wherein the RNC communicates with the CO according to the GR-303 protocol.

18. The method of claim 16 wherein the out-of-band message comprises a CC_SETUP message.

* * * * *